United States Patent [19]

Berkel et al.

[11] B  4,013,431

[45] Mar. 22, 1977

[54] PARTIAL OR COMPLETE SEPARATION OF GAS MIXTURES, CONTAINING AMMONIA AND CARBON DIOXIDE

[75] Inventors: Wilhelm Berkel, Mutterstadt; Hans Gettert, Mannheim, both of Germany

[73] Assignee: BASF Aktiengesellschaft, Ludwigshafen (Rhine), Germany

[22] Filed: Apr. 1, 1974

[21] Appl. No.: 456,905

[44] Published under the second Trial Voluntary Protest Program on March 23, 1976 as document No. B 456,905.

[30] Foreign Application Priority Data

Apr. 7, 1973    Germany .......................... 2317603

[52] U.S. Cl. ........................................ 55/70; 55/68; 55/90; 55/93
[51] Int. Cl.² ........................................ B01D 53/14
[58] Field of Search ............... 55/70, 68, 48, 90, 93

[56] References Cited

UNITED STATES PATENTS

| 2,950,173 | 8/1960 | Baroni et al. ...................... 55/70 X |
| 3,315,442 | 4/1967 | Yuan et al. ............................ 55/70 |
| 3,607,047 | 9/1971 | Broom et al. ...................... 55/70 X |
| 3,647,872 | 3/1972 | Kaasenbroud et al. ............ 55/70 X |
| 3,691,729 | 9/1972 | DeRooy et al. ...................... 55/70 |

OTHER PUBLICATIONS

A. V. Slack et al., "Ammonia" Part I, 1973, pp. 67–68.

*Primary Examiner*—John Adee
*Attorney, Agent, or Firm*—Johnston, Keil, Thompson & Shurtleff

[57] ABSTRACT

Gas mixtures containing ammonia and carbon dioxide are separated by fractional absorption in a solvent. The gas mixture and solvent are intimately mixed in a zone, the residence time of the gas in the mixing zone being restricted to a maximum of 0.1 second. Non-absorbed gas and solvent are then separated from one another and the gas separated off is subjected to a further absorption if necessary.

8 Claims, 1 Drawing Figure

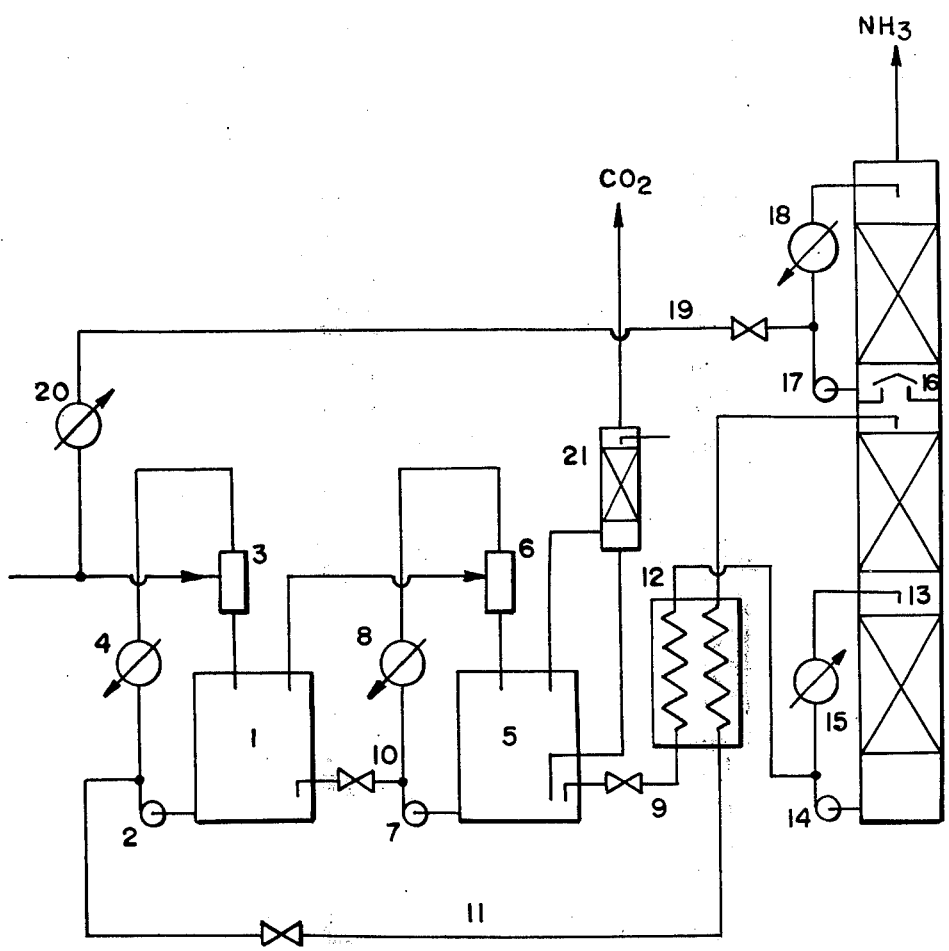

PARTIAL OR COMPLETE SEPARATION OF GAS MIXTURES, CONTAINING AMMONIA AND CARBON DIOXIDE

This invention relates to the separation of gas mixtures containing ammonia and carbon dioxide by absorption in a solvent.

In the synthesis of urea from ammonia and carbon dioxide, and the synthesis of melamine from urea, gas mixtures containing ammonia and carbon dioxide are produced, and these must be reused in order to utilize the ammonia, which determines the value of the mixture. This use can comprise, for example, recycling the ammonia/carbon dioxide mixture to the urea synthesis. This recycling is usually effected by absorbing the mixture in water and introducing the carbamate solution thus obtained into the urea reactor. This procedure has the disadvantage that the additional water introduced reduces the degree of conversion in the urea reactor.

Another possible way of using the gas containing ammonia and carbon dioxide is to react the ammonia with acids or acid solutions, so as to produce ammonium salts. This procedure is relatively easy but necessarily couples the production of salts to the process in which the gas mixture arises.

In order to avoid such coupling, it is desirable to separate out the ammonia from the gas mixture and to isolate it in a pure form, preferably as liquid, so that it can be stored in the usual way, and can be reused for whatever purpose is desired.

A process which aims at complete separation is described in German Printed Application 1,592,349. In this process, carbon dioxide is first absorbed from the gas mixture by means of an ammonium carbonate solution rich in ammonia, this solution is then freed as far as possible from dissolved ammonia at atmospheric pressure by a conventional method using fractional warm desorption, and the ammonia gas is collected, and after this pure carbon dioxide is separated by a conventional method, in another column, from the constant-boiling ammonium carbonate solution which remains, by distillation under elevated pressure whilst charging in a small amount of water at the top of the pressure column, and is collected, whilst the residue consisting of an ammonium carbonate solution rich in ammonia is recycled to the carbon dioxide absorption.

The disadvantage of this process is that the separation of the gas into its constituents requires substantial amounts of energy at relatively high temperatures since the carbon dioxide must be separated off under pressure at 120° to 170°C.

It is an object of the present invention to provide a process for the partial or complete separation of carbon dioxide and ammonia from gas mixtures containing the same, by absorption in a solvent.

We have found that this object is achieved by effecting the absorption in a zone in which the solvent and gas mixture are intimately mixed with one another and non-absorbed gas mixture and solvent are then separated from one another, the residence time of the gas in the mixing zone being restricted to a maximum of 0.1 second.

Surprisingly, the process of the invention results in ammonia being dissolved to a greater extent than carbon dioxide, so that the non-absorbed gas is enriched in carbon dioxide compared to the feed gas, whilst ammonia accumulates in the solvent.

If such an absorption process is followed by a second and possibly a third absorption process, substantially complete absorption of the ammonia is achievable and a substantial proportion of the carbon dioxide can be separated off practically free from ammonia. If more than one mixing zone is used, it is advantageous to feed the gas mixture and the solvent in countercurrent.

Gases which can be subjected to the treatment according to the invention are all gases which contain carbon dioxide and ammonia with or without other constituents, such as nitrogen, hydrogen or other inert gases. The advantages of the process according to the invention come fully into play if the gas mixtures contain at least 5 per cent by volume of carbon dioxide and at least 10 per cent by volume of ammonia. Accordingly, the process can be used for working up gases arising, for example, in the synthesis of urea and especially in the synthesis of melamine from urea, and containing 5 to 40 per cent by volume of carbon dioxide and 60 to 95 per cent by volume of ammonia.

Suitable solvents are all solvents which have good solvent power for ammonium carbamate, such as, in particular, water or aqueous solutions which may already contain ammonia and carbon dioxide dissolved as ammonium carbamate or ammonium carbonate, but also organic solvents such as, in particular, polyhydric alcohols, for example ethylene glycol and glycerol.

The absorption should preferably be carried out at as low a temperature as possible. It has been found, surprisingly, that the lower the temperature is, the less carbon dioxide is dissolved. A lower limit is imposed on the temperature firstly through the fact that no solids should crystallize out and secondly through the fact that it should still be possible to carry out the process economically, so that the temperature of the solvent on leaving the mixing zone should not be less than $-5°C$. On the other hand, a suitable upper temperature limit is 50°C. The process is preferably carried out in the temperature range from 10° to 40°C. These temperatures in each case relate to the temperature of the solvent on leaving the mixing zone.

In order to take the separation as far as possible, the amount of solvent circulating through the mixing zone should be kept within the lowest range determined by the above exit temperature, since otherwise increased absorption of carbon dioxide will occur. Furthermore, the final concentration of ammonia should not be excessive and should preferably be about 5 to 15 per cent by weight to prevent excessive absorption of carbon dioxide.

To obtain pure ammonia from the solutions obtained in the mixing zones, the solutions are subjected to desorption which is preferably carried out in such a way that the entire ammonia and carbon dioxide taken up during absorption is desorbed. The resultant gas mixture of a relatively large amount of ammonia and relatively little carbon dioxide contains solvent vapor in addition to these two constituents. By cooling this mixture and condensing the solvent it is possible to isolate, under conventional conditions, a concentrated solution of ammonium carbamate which contains the entire carbon dioxide present in the desorbed gas. The gas not condensed during this stage is practically pure ammonia. In particular, it is substantially free of carbon dioxide, but may still contain solvent vapor from which it can, however, be separated by simple conventional methods.

If the concentrated carbamate solution obtained by this procedure is completely evaporated, the resultant mixture of ammonia, carbon dioxide and solvent vapor is combined with the gas mixture which freshly enters the process, and the whole is subjected to absorption, a process which permits complete separation and recovery of the ammonia results.

As mixing zones it is possible to use conventional mixing devices such as are employed industrially as ejectors or mixing nozzles. The only decisive factor is that they should allow a short mixing time, of less than 1/10 second, to be achieved. After leaving the mixing zone, the gas and solvent are separated from one another as rapidly and completely as possible by conventional methods in order to prevent post-absorption, though the latter takes place considerably more slowly, since the gas and solvent are no longer thoroughly mixed with one another.

The process according to the invention will be explained in more detail with reference to FIG. 1, which diagrammatically shows a plant for substantially complete separation of a gas mixture containing ammonia and carbon dioxide, using water as the absorbent.

The mixture which is to be separated, for example the exit gas from a melamine plant, is mixed, if desired, with the ammonia/carbon dioxide/water vapor mixture obtained by evaporation of a carbamate solution recycled to the process, and passed into a first mixing zone. This zone forms part of the first absorption stage, which comprises, inter alia, a separating vessel 1 in which the bottoms consist of absorption solution. This solution is pumped by means of pump 2 through mixing nozzle 3 which serves as the mixing zone and into which the gas mixture to be separated is fed. The heat of absorption thereby generated is removed by a cooler 4. The gas which has not been absorbed passes to a second, essentially similar, absorption stage, which again consists of a separating vessel 5, a mixing nozzle 6, a circulating pump 7 and a cooler 8. The exit gas obtained from this second absorption stage is carbon dioxide substantially free from ammonia; the carbon dioxide can optionally be washed in a small wash column 21. It is convenient to use, for this purpose, the amount of water which must be fed to the process to restore the water balance, that is to say to replace the water vapor lost with the moist ammonia.

A solution which comes from the desorption plant is fed as the absorbent into the second absorption stage, through pipeline 9. A corresponding amount of absorption solution passes from this absorption stage, through pipeline 10, into the first absorption stage. The absorption liquid obtained there, and brought to the desired concentration, is fed to the desorption stage through pipeline 11. Thus, gas mixture and absorbent are fed in countercurrent in both absorption stages.

The solution to be desorbed is first heated in a heat exchanger 12 by the solution returned from the desorption stage, and is fed into a distillation column 13. The contents of the column are pumped through the heat exchanger 15 by means of pump 14 and thus raised to the requisite temperature. The desorbed gases, which consist mainly of ammonia, with some carbon dioxide and water vapor, pass via a dividing tray 16 into the upper part of the column 13 and are there cooled to the point that a concentrated carbamate solution in condensed water, containing practically the entire carbon dioxide, is obtained on the dividing tray. This cooling can suitably be effected by pumping off the liquid on the dividing tray by means of pump 17 and pumping it through a cooler 18 so that it is cooled to the requisite degree. The concentrated solution thus obtained is returned through pipeline 19 and vaporizer 20 to the process, together with freshly fed gas. Ammonia which is practically free of carbon dioxide but still contains water vapor is obtained at the top of the column and can be dried and liquefied by conventional methods.

EXAMPLE 1

A gas mixture of 4.4 kg of ammonia/hour and 4.72 kg of carbon dioxide/hour is fed into the side of a tube of 12 mm inside diameter which serves as the mixing device, and is mixed with an ammonium carbamate solution which is recycled at a rate of 300 l/hour. The mixing zone is 250 mm long. The residence time is calculated to be approx. 0.012 second, from the cross-section of the tube and the length of the mixing zone, on the one hand, and from the gas throughput and amount of solvent circulated, on the other. After leaving the lower orifice of the tube, the gas is separated from the liquid in a flask of approx. 1 l capacity, and removed. The liquid is taken up by a pump and recycled to the mixing tube via a cooler. Sufficient fresh water is added to this circulating liquid to adjust the concentration of ammonia in the solution obtained to approx. 10 per cent by weight; at the same time sufficient solution is withdrawn from the circuit to maintain a constant amount of liquid in the apparatus. The cooling adjusts the temperature to 35° C in the solution issuing from the mixing tube. In this procedure, 89.5% of the ammonia introduced, and only 18.5% of the carbon dioxide introduced, are absorbed; accordingly, the exit gas contains 81.4% of the carbon dioxide introduced and only 10.5% of the ammonia introduced. Hence, the solution has become greatly enriched in ammonia and the exit gas greatly enriched in carbon dioxide.

In a parallel experiment using the same device except that the mixing zone was lengthened from 250 to 400 mm, the amount of gas introduced is reduced to one-tenth, i.e. only 440 g of ammonia and 472 g of carbon dioxide are employed hourly; the remaining conditions are kept the same.

In this case, the calculated residence time is approx. 0.2 second. Under these conditions, 98.6% of the ammonia and 77.8% of the carbon dioxide are absorbed, whilst the exit gas contains 1.4% of the ammonia employed and only 22.2% of the carbon dioxide. Hence, the separating effect is very much less than with the extremely short residence time.

EXAMPLE 2

The amounts stated in this example are the hourly throughput.

A gas mixture consisting of ammonia and carbon dioxide is introduced into a plant shown diagrammatically in FIG. 1. The gas is composed of 2,380 kg of ammonia and 2,560 kg of carbon dioxide. Before entering the first absorption stage, a gas mixture which has been produced by evaporating an aqueous solution of 520 kg of ammonia and 554 kg of carbon dioxide in 737 kg of water is fed into the first gas mixture through the heat exchanger 20. The mixture thus obtained is brought into contact, in the first absorption stage, with a solution which has been withdrawn from the second absorption stage through pipeline 10. The mixing time is approx. 2/100 second. The solution is circulated at an hourly rate of 160 m³ through the cooler 4. The cooler is operated so as to produce a temperature of 35°C in the solution issuing from the mixing device 3. 87% of the total available ammonia and 14% of the available carbon dioxide are absorbed. The exit gas from the first absorption stage consists of 367 kg of ammonia, 2,678 kg of carbon dioxide and 82 kg of water vapor; it is passed to the second absorption stage to undergo further separation. There, 85% of the residual ammonia and 5% of the residual carbon dioxide are absorbed in a solution coming from the desorption stage. In the second absorption stage, the absorption solution is circulated in an amount of approx. 50 m³ hourly through the cooler 8 and the mixing device 6 and is cooled to the point that the temperature on issuing from the mixer is approx. 30°C. Here again the mixing time is set to approx. 2/100 second. The exit gas from this stage consists of 2,544 kg of carbon dioxide, 57 kg of ammonia and 46 kg of water vapor.

The gas is thus almost pure carbon dioxide. If it is desired to remove the last traces of ammonia, then this can be done by treatment with the 424 kg of water which are required to make up the water balance and which must in any case be introduced into the second absorption stage.

The solution issuing from the second absorption stage passes, as already described, into the first absorption stage; the solution obtained there, which consists of 4,436 kg of ammonia, 1,406 kg of carbon dioxide and 38,518 kg of water, passes through pipeline 11 and a heat exchanger 12 into the desorption column 13.

In this column, 64.1% of the ammonia introduced in the form of the solution are removed as a gas at a temperature of approx. 90°C. At the same time, 570 kg of carbon dioxide are desorbed. The desorbed gases are cooled to approx. 55°C in the upper part of the desorption column by means of cold solution circulating through the cooler 18. This results in the condensation of 737 kg of water in which 520 kg of ammonia and 554 kg of carbon dioxide are dissolved; this solution is returned, together with the fresh gas, to the second absorption stage to undergo renewed separation. The gas which leaves the upper part of the column consists of 2,323 kg of ammonia and 378 kg of water together with 16 kg of carbon dioxide. It is thus substantially pure ammonia which can be freed from the bulk of the water and all the carbon dioxide by further cooling and can subsequently be dried, and liquefied, by conventional methods.

We claim:

1. A process for the separation of a gas mixture containing ammonia and carbon dioxide by absorption in a solvent, which process comprises carrying out the absorption of said gas mixture in a mixing zone in which water as the solvent and said gas mixture are intimately mixed and thereafter separating non-absorbed gas mixture and water from one another, the residence time of the gas in the mixing zone being limited to a maximum of 0.1 second in order to absorb the ammonia to a substantially greater extent than the carbon dioxide.

2. A process as claimed in claim 1 wherein the non-absorbed gas mixture is subjected to a renewed absorption with water in at least one subsequent additional mixing zone, using a residence time of not more than 0.1 second in each additional mixing zone.

3. A process as claimed in claim 1 wherein the temperature of the water issuing from the mixing zone is kept at −5° to +50°C.

4. A process as claimed in claim 1 wherein the temperature of the water issuing from the mixing zone is kept at 10° to 40°C.

5. A process as claimed in claim 1 wherein the ammonia and the carbon dioxide are desorbed from the water withdrawn from the mixing zone by heating, the gas mixture obtained by desorption is cooled to give a concentrated ammonium carbamate solution and the non-absorbed ammonia is separated from this solution.

6. A process as claimed in claim 5 wherein the ammonium carbamate solution is again evaporated and recycled to the mixing zone together with fresh gases containing ammonia and carbon dioxide.

7. A process as claimed in claim 1 wherein said gas mixture consists essentially of at least 5% by volume of carbon dioxide and at least 10% by volume of ammonia.

8. A process as claimed in claim 1 wherein said gas mixture consists essentially of 5 to 40% by volume of carbon dioxide and 60 to 95% by volume of ammonia.

* * * * *